US012100924B2

(12) United States Patent
Bluemmel et al.

(10) Patent No.: US 12,100,924 B2
(45) Date of Patent: Sep. 24, 2024

(54) CRIMP AND METHOD FOR PRODUCING A CRIMP

(71) Applicants: TE Connectivity India Private Limited, Bangalore (IN); TE Connectivity Germany GmbH, Bensheim (DE)

(72) Inventors: Uwe Bluemmel, Bensheim (DE); Shashikumar S N, Bangalore (IN); Vinayakumar Shettar, Bangalore (IN); Saravanakumar M, Bangalore (IN); Deepak A G, Bangalore (IN)

(73) Assignees: TE Connectivity Germany GmbH, Bensheim (DE); TE Connectivity India Private Limited, Bangalore (IN)

( * ) Notice: Subject to any disclaimer, the term of this patent is extended or adjusted under 35 U.S.C. 154(b) by 0 days.

(21) Appl. No.: 17/136,238

(22) Filed: Dec. 29, 2020

(65) Prior Publication Data

US 2021/0119354 A1 Apr. 22, 2021

Related U.S. Application Data

(63) Continuation of application No. PCT/EP2019/066658, filed on Jun. 24, 2019.

(30) Foreign Application Priority Data

Jun. 29, 2018 (IN) ............................ 201841024239
Oct. 23, 2018 (EP) .................................... 18201998

(51) Int. Cl.
*H01R 4/18* (2006.01)
*H01R 4/16* (2006.01)

(52) U.S. Cl.
CPC ............... *H01R 4/184* (2013.01); *H01R 4/16* (2013.01)

(58) Field of Classification Search
CPC . H01R 4/18; H01R 4/184; H01R 4/16; H01R 11/08; H01R 4/00
USPC ........ 174/84 R, 84 C, 88 C; 439/95 R, 97 C, 439/98, 223 R, 223 S
See application file for complete search history.

(56) References Cited

U.S. PATENT DOCUMENTS 1,672,201 A 6/1928 Champion
3,032,602 A * 5/1962 Farnell .................. H01R 4/184 439/877
3,051,773 A * 8/1962 Batcheller ............. H01R 4/185 29/521

(Continued)

FOREIGN PATENT DOCUMENTS

CN 1511361 A 7/2004
CN 102144336 A 8/2011

(Continued)

OTHER PUBLICATIONS

PCT International Preliminary Report on Patentability and The Written Opinion, dated Dec. 29, 2020, 10 pages.

(Continued)

*Primary Examiner* — William H. Mayo, III
(74) *Attorney, Agent, or Firm* — Barley Snyder

(57) ABSTRACT

A crimp includes a crimp barrel having a first side wall and a second side wall. The first side wall has a self-locking wing and the second side wall has a self-locking hooked pocket. The self-locking wing is adapted to lock with the self-locking hooked pocket.

20 Claims, 7 Drawing Sheets

(56) References Cited

U.S. PATENT DOCUMENTS

| | | | | | |
|---|---|---|---|---|---|
| 3,404,368 | A | * | 10/1968 | Roberts | H01R 24/20 439/867 |
| 4,142,771 | A | * | 3/1979 | Barnes | H01R 4/184 439/442 |
| 4,692,122 | A | | 9/1987 | Montalbano | |
| 5,561,267 | A | | 10/1996 | Fudoo et al. | |
| 5,901,439 | A | | 5/1999 | Endo et al. | |
| 6,875,063 | B2 | | 4/2005 | Zhao et al. | |
| 8,333,624 | B2 | | 12/2012 | Kakuta | |
| 9,147,944 | B2 | | 9/2015 | Aizawa et al. | |
| 2007/0066148 | A1 | | 3/2007 | Froschl | |
| 2015/0244084 | A1 | | 8/2015 | Aizawa et al. | |

FOREIGN PATENT DOCUMENTS

| | | | | | |
|---|---|---|---|---|---|
| CN | 103855495 | A | | 6/2014 | |
| CN | 104067446 | A | | 9/2014 | |
| CN | 104067446 | B | | 7/2017 | |
| DE | 102006045567 | A1 | | 4/2008 | |
| EP | 1764869 | A2 | | 3/2007 | |
| GB | 2041794 | A | | 9/1980 | |
| JP | 2010-055903 | A | * | 3/2010 | H01R 4/18 |
| JP | 2010-067455 | | * | 3/2010 | H01R 4/18 |
| JP | 2010-073442 | | * | 4/2010 | H01R 4/18 |
| JP | 2011040199 | A | | 2/2011 | |
| JP | 2014060103 | A | | 4/2014 | |
| NL | 6610432 | A | | 2/1967 | |

OTHER PUBLICATIONS

PCT Notification, The International Search Report and The Written Opinion, dated Aug. 28, 2019, 17 pages.

Abstract of DE 102006045567, dated Apr. 24, 2008, 1 page.

First Office Action from the CNIPA in Appln. No. 201980043137.6, dated Sep. 14, 2021, and English translation thereof, 16 pp.

Abstract of CN103855495A, dated Jun. 11, 2014, 1 p.

Chinese Office Action and English Translation, Application No. 201980043137.6, Dated: Mar. 24, 2022, 15 pages.

Japanese Notice of Refusal and English Translation, Application No. 2020-572515, Dated: Mar. 15, 2022, 12 pages.

Chinese Third Office Action with English translation, Application No. 201980043137.6, Dated: Aug. 25, 2022, 12 pages.

Korean Office Action dated Apr. 19, 2023 with English translation thereof, corresponding to Application No. 10-2021-7002848, 8 pages.

* cited by examiner

CRIMP AND METHOD FOR PRODUCING A CRIMP

CROSS-REFERENCE TO RELATED APPLICATIONS

This application is a continuation of PCT International Application No. PCT/EP2019/066658, filed on Jun. 24, 2019, which claims priority under 35 U.S.C. § 119 to Indian Patent Application No. 201841024239, filed on Jun. 29, 2018, and European Patent Application 18201998.4, filed on Oct. 23, 2018.

FIELD OF THE INVENTION

The present invention relates to a crimp and, more particularly, to a crimp with increased robustness and thinner stock material.

BACKGROUND

In electronics and electrical engineering, there are known a large number of electromechanical connections, which serve to transmit electrical currents, electrical voltages and/or electrical signals with the greatest possible range of currents, voltages, and frequencies and/or data rates. Such connections must temporarily, where applicable after a comparatively long period of time, or permanently ensure correct transmission of mechanical contact, electrical power, electrical signals and/or data under thermally loaded, dirty, damp and/or chemically aggressive conditions. Therefore, a large number of specially constructed electromechanical contacts, in particular crimp contacts are known.

A crimp connection is a solderless connection. The crimp connection is advantageous over a normal pinching of the terminal on to the end of a wire. The shape of the crimp and amount of pressure applied must be correct in order to obtain the desired performance and durability of the connection. Improper crimps may generate heat due to poor electrical connections and may result in the rework of the product, increased scrap and, in extreme cases, catastrophic failure.

Electrical terminals are often used to terminate the ends of wires. Such electrical terminals typically include an electrical contact and a crimp barrel. In some terminals, the crimp barrel includes an open area that receives an end of the wire therein. The crimp barrel is crimped around the end of the wire to establish an electrical connection between electrical conductors in the wire and the terminal as well as to mechanically hold the electrical terminal on the wire end. When crimped over the wire end, the crimp barrel establishes an electrical and mechanical connection between the conductors of the wire and the electrical contact.

In addition to a permanent electrical connection, a permanent mechanical connection must also be produced between the cable and a conductor crimp region of the crimp contact by a contact. For an electromechanical connection, the crimp contact has a conductor crimp region, and in most cases an insulation crimp region for the cable. Miniaturization and cost savings are forcing manufacturers towards smaller and thinner contacts.

Crimp connections known in the art serve to establish an electrical contact as well as to provide a mechanically resilient connection between a crimping base and at least one electrical conductor, which can comprise one or more individual wires. The crimp barrel usually is formed from a metal plate, which is bent to have a U- or V-shaped cross-section, or has rectangular cross-sections with a flat base.

The underside of the U- or V-shape is hereinafter referred to as crimp base. The upwardly pointing legs of the U- or V-shape are generally known as crimp flanks.

FIG. 1 shows a typical wire barrel crimp 1 as found in the prior art. Such a crimp 1 suffers from the problem of lack of robustness during mechanical and torsional stresses.

The crimp connection is produced by a crimping die, which consists of an anvil and crimping stamp. For crimping, the crimping base is positioned centrally on the anvil, and the electrical conductor is placed between crimping legs on the crimping barrel. Subsequently, the crimping stamp descends onto the anvil and bends the crimp flanks around the electrical conductor in order to compress it tightly, and to fix it in a force-locking manner with the crimping barrel. In the transition area from the crimp base to the crimp side-walls, the so-called crimping roots, as well as laterally at the crimp side-walls, zones of high bending stresses are formed in the crimp barrel.

The force connection between the crimp barrel and the electrical conductor can be improved by providing additional form-fitting elements, for example, recesses or depressions on the inner side of the crimp barrel facing the conductor for the creation of locking elements, wherein displaced conductor material can penetrate into the recesses during compression.

The pressed zones of a crimping connection have better electrical properties. The less heavily pressed areas have a higher mechanical stability. The crimping barrel and the electrical conductor can be locally reinforced by steps or projections in the crimping die.

U.S. Pat. No. 5,901,439 discloses how the compression can be locally increased by feeding an additional punch through an opening in the working surface of the anvil when the crimping die is closed.

German Patent Application DE 10 2006 045 567 A1 describes a staggered seam on an F-Crimp formed by a crimp tool with consecutive offset in the roll-in geometry.

U.S. Pat. No. 5,561,267A describes a crimp terminal having a crimp barrel crimped to an end of an electric wire. The crimp barrel has a body of a semicircular cross section, and a couple of crimp wings which integrally extend from ends of the circular arc of the body and are caulked around the end of the electric wire in a mutually overlapped state. The crimp wings are over-lapped and locked so they prevent each other from moving in a direction to release the overlap.

If the crimp connection is subjected to mechanical stress, the crimping flanks may spring up along the crimping roots and other zones of high bending stresses. There is the risk that the crimping base opens along the longitudinal seam at the ends of the crimp side-walls. Depending on the type of stress, the ends of the crimp side-walls can also move axially relative to each other. Moreover, a reduction in the crimping forces in the prior art is favored in that the individual wires of the electrical conductor can move relative to each other. When they are displaced in the longitudinal direction, the force of the crimped connection is reduced by the resultant free spaces. The free spaces offer the possibility of external material penetrating into the crimped connection. The crimping forces are then further weakened by corrosion of the electrical conductor and the crimping barrel caused by the external agents.

In the event of a loss of crimping force, the desired mechanical stability of the crimping connection can no longer be maintained. It was found with conventional crimps that in case of movements on the connected line or the electrical conductor, a movement of the individual wires of the electrical conductor at the other end of the crimp connection can be observed. This indicates that both the individual wires of the electrical conductor, as well as the electrical conductor and the crimp barrel are no longer fixed in a sufficiently secure manner. In the individual case, therefore, increased electrical transition resistances between the crimp barrel and the electrical conductor can occur.

To achieve mechanical and electrical robustness of a crimp, in particular an F-Crimp, the crimp barrel must have a sufficient stock thickness of the sheet metal (related to the wire size). Especially for large wires, this minimum barrel stock thickness creates disadvantages such as less suitability to be cut or bent in stamping process for manufacturing an electrical terminal from sheet metal, high force required for the crimp process, and high material cost. In order to address the above problems, crimps in the prior art use a thin stock. However, it was found that with that when using too thin stock, the crimp starts to fail at the seam of the roll-in for mechanical and electrical performance. There is a need for providing a terminal device that allows safely, electrically connecting a large number of wires, with the terminal device being robust and cost effective at the same time.

SUMMARY

A crimp includes a crimp barrel having a first side wall and a second side wall. The first side wall has a self-locking wing and the second side wall has a self-locking hooked pocket. The self-locking wing is adapted to lock with the self-locking hooked pocket.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
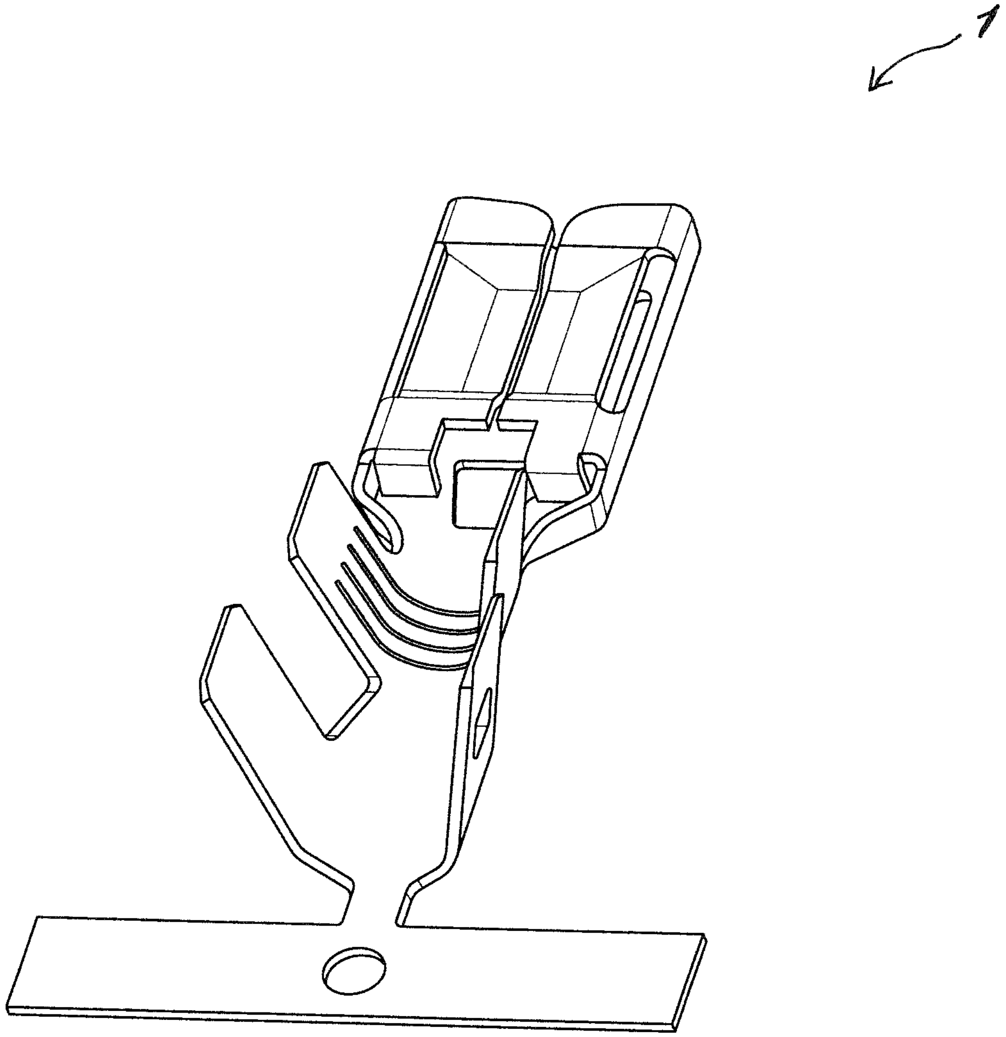
Fig. 1 PRIOR ART
FIG. 1 is a perspective view of a crimp according to the prior art.

The invention is explained in greater detail below with reference to embodiments and the appended drawings. Elements or components which have an identical, univocal or similar construction and/or function are referred to in various Figures of the drawings with the same reference numerals. Benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

Prior to a description of embodiments of the present disclosure, underlying knowledge forming the basis of the present disclosure is described. Specific embodiments of the present disclosure are described below. Note, however, that an excessively detailed description may be omitted. For example, a detailed description of an already well-known matter, and a repeated description of substantially identical components may be omitted. This is intended to avoid unnecessary redundancies of the following description and facilitate understanding of persons skilled in the art. It should be noted that the inventors provide the accompanying drawings and the following description so that persons skilled in the art can fully understand the present disclosure, and that the accompanying drawings and the following description are not intended to limit the subject matter recited in the claims.

Figure 2:
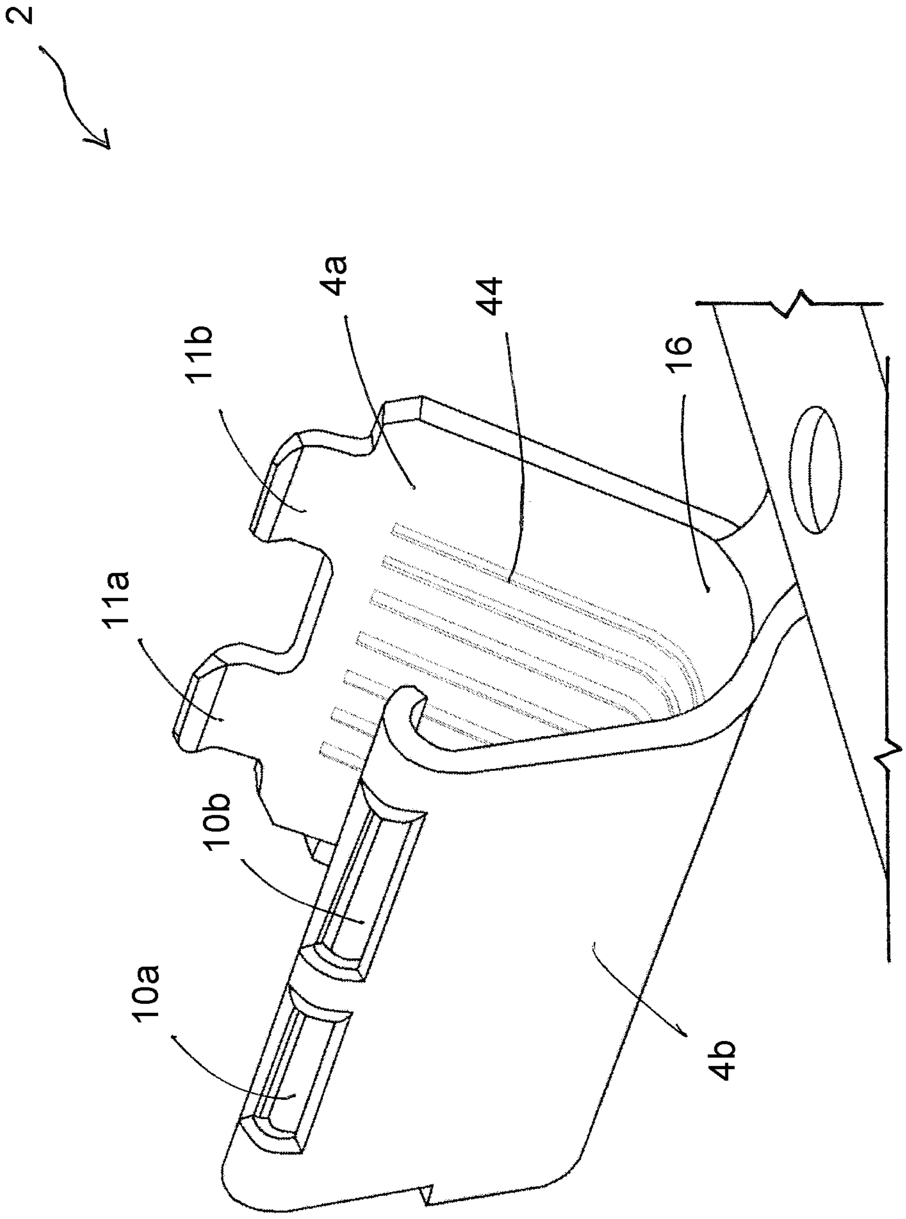
FIG. 2 is a perspective view of a self-locking hooked crimp according to an embodiment.

FIG. 2 shows a schematic representation of a self-locking hooked crimp 2 according to an embodiment of the present disclosure. Throughout the description, the self-locking hooked crimp 2 may alternatively be referred to as a "self-locking crimp" or just a "crimp".

As shown in FIG. 2, a first side wall 4*a* of the self-locking hooked crimp 2 has a pair of self-locking wings 11*a* and 11*b*. A second side wall 4*b* has a self-locking hooked pocket 10*a*, 10*b*. The first side wall 4*a* and the second side wall 4*b* extend opposing one another from a base of the crimp 2. In an embodiment, the self-locking hooked pockets 10*a*, 10*b* and the self-locking wings 11*a*, 11*b* extend up to the base of the crimp 2. In an embodiment, the self-locking wing 11*a*, 11*b* has an entry chamber and the self-locking hooked pockets 10*a*, 10*b* have an entry guide in a front side and a rear side of the pocket 10*a*, 10*b*.

In the self-locking hooked crimp 2, the self-locking wings 11*a*, 11*b* interlock with the self-locking hooked pocket 10*a*, 10*b* during the crimping operation, which in turn gives more mechanical robustness and electrical robustness against mechanical and torsional stresses with thinner stock thickness. Due to the compression and axial elongation during forming of the self-locking hooked crimp 2, the edges of the self-locking wings 11*a*, 11*b* and self-locking pockets 10*a*, 10*b* get squeezed against each other, which creates an interlock connection of the seam, thus providing additional robustness.

Figure 3:
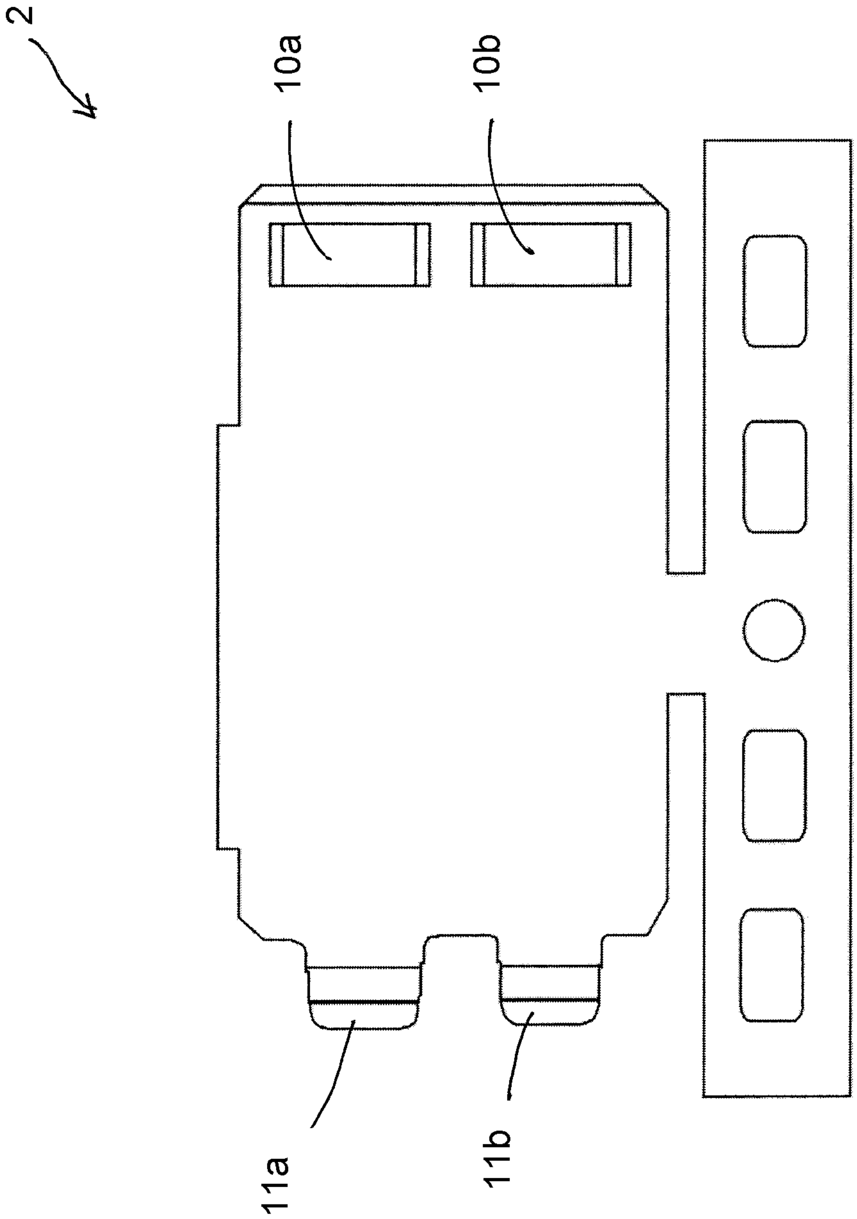
FIG. 3 is a bottom view of the self-locking hooked crimp of FIG. 2.

FIG. 3 is a flat perspective bottom view of the self-locking crimp 2 according the present disclosure, in other words before being bent into a three dimensional shape. Various dimensions of the self-locking wings 11*a*, 11*b* and the self-locking pockets 10*a*, 10*b* can be suitably adapted to the particular use case.

In an embodiment, as shown in FIG. 2, an interior surface of a crimp barrel 16 of the self-locking crimp 2 may include one or more serrations 44 for penetrating an oxide and/or other surface material (such as, but not limited to, residual wire extrusion enhancement materials, and/or the like), layer that has built up on electrical conductors crimped by the self-locking crimp 2. The interior surfaces may each be referred to herein as a "metallic surface" of the crimp barrel 16. In an embodiment, the crimp barrel 16 is an F-crimp wire barrel.

Figure 4D:
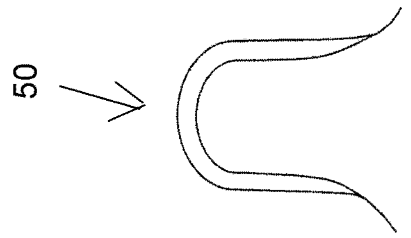
FIG. 4D is a front view of a crimper according to an embodiment.
Figure 4C:
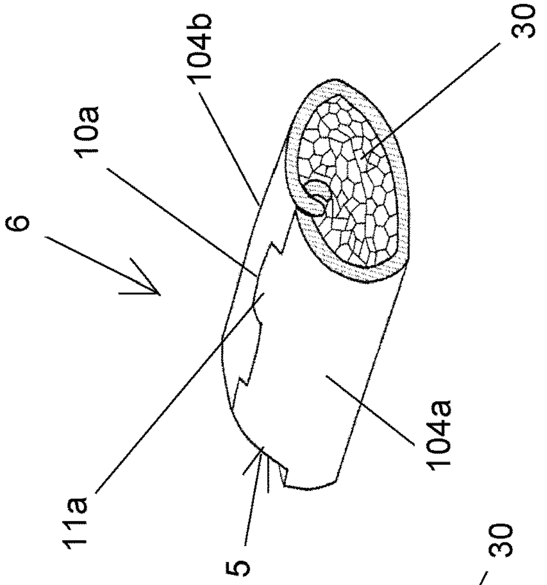
FIG. 4C is a sectional perspective view of the crimp connection of FIG. 4B.
Figure 4B:
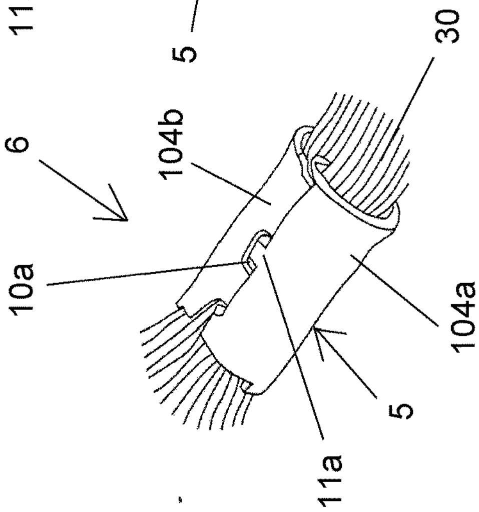
FIG. 4B is a perspective view of a crimp connection including the self-locking hooked crimp of FIG. 4A and a plurality of conductors.
Figure 4A:
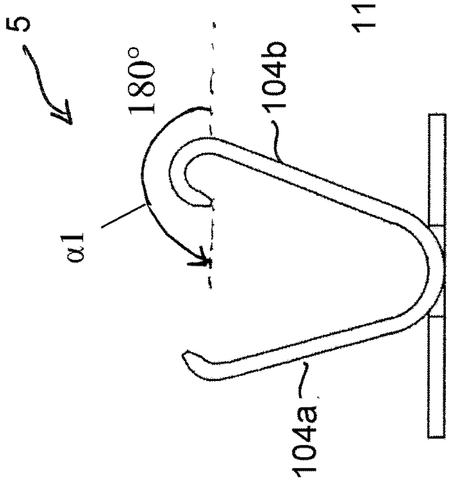
FIG. 4A is an end view of a self-locking hooked crimp according to another embodiment.

FIG. 4A is a schematic representation of an embodiment of self-locking hooked crimp 5 according to another embodiment of the present disclosure. In this embodiment, a side wall 104*b* with the self-locking hooked pocket 10*a*, 10*b* is bent approximately by 180 degrees. Such a bending angle α1 of the self-locking hooked pocket 10*a*, 10*b* provides extra robustness to enhance the resilience of the interlock seam of the self-locking hooked crimp 5 against external stresses.

FIG. 4B is a schematic representation of a crimp connection 6 formed by the self-locking hooked crimp 5 showing interlocking of the side walls 104*a*, 104*b* around a plurality of electrical wires or conductors 30. FIG. 4C is a schematic cross section of the self-locking hooked crimp connection 6 showing the interlocking of the wing 11*a* with the pocket 10*a*. FIG. 4D is a schematic representation of so called "O profile thorough" of a crimper 50 suitable for the crimping operation of the self-locking hooked crimp connection 6.

Figure 5C:
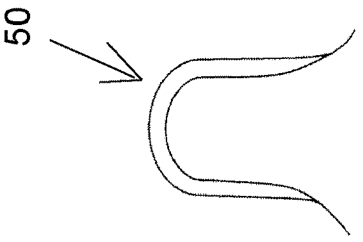
FIG. 5C is a front view of a crimper according to an embodiment.
Figure 5B:
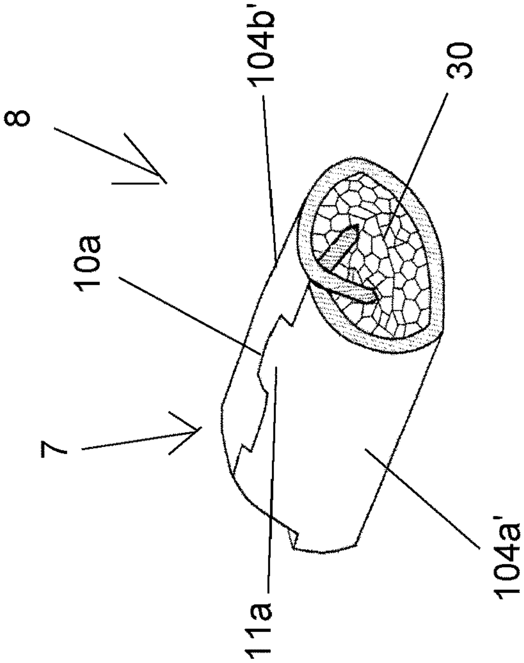
FIG. 5B is a sectional perspective view a crimp connection including the self-locking hooked crimp of FIG. 5A and a plurality of conductors.
Figure 5A:
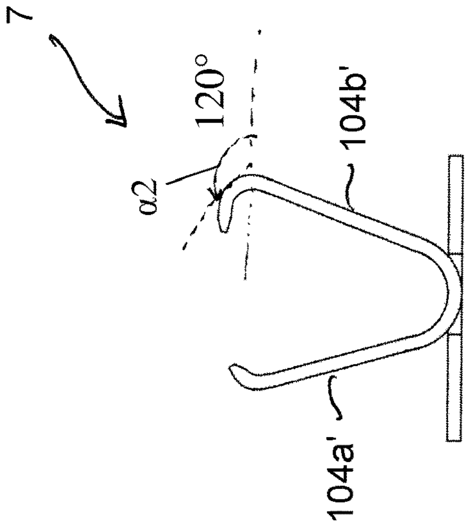
FIG. 5A is an end view of a self-locking hooked crimp according to another embodiment.

FIG. 5A is a schematic representation of an embodiment of self-locking hooked crimp 7 according to another embodiment of the present disclosure. In this embodiment, the side wall 104*b*' with the self-locking hooked pocket 10*a*, 10*b* is bent approximately by 120 degrees. Such a bending angle α2 of the self-locking hooked pocket 10*a*, 10*b* provides extra robustness to enhance the resilience of the interlock seam of the self-locking hooked crimp 7 against external stresses.

FIG. 5B is a schematic cross section of a crimp connection 8 formed by the self-locking hooked crimp 7 showing the interlocking of the wing 11*a* with the pocket 10*a* around the electrical conductors 30. FIG. 5C is a schematic of the "O profile thorough" of the crimper 50 suitable for the crimping operation of the self-locking hooked crimp 7.

Figure 6:
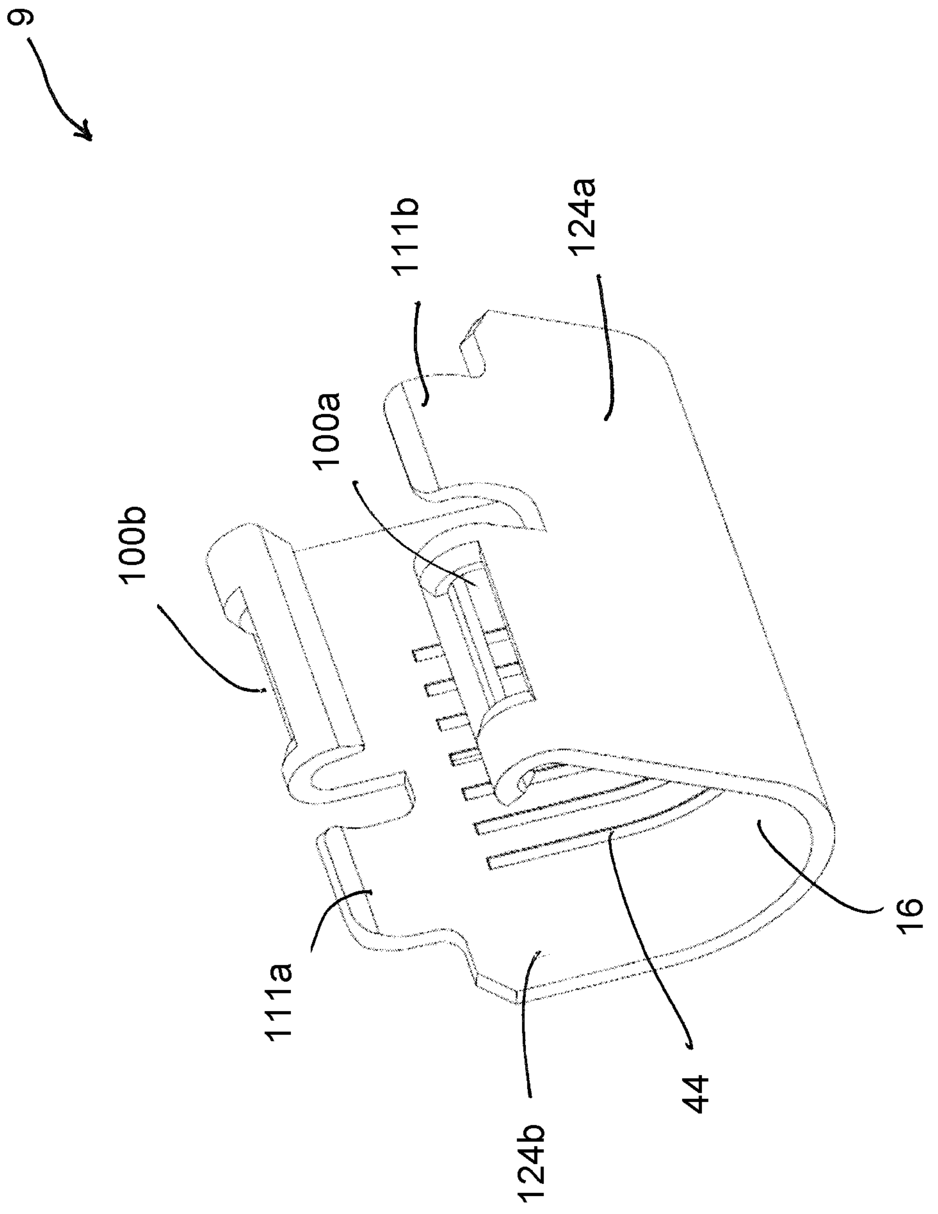
FIG. 6 is a perspective view of a self-locking hooked crimp according to another embodiment.

FIG. 6 shows a schematic view of another embodiment of the self-locking hooked crimp 9 according to an embodiment. A first side wall 124*a* has a self-locking wing 111*b* and a self-locking hooked pocket 100*a*. A second side wall 124*b* has a self-locking hooked pocket 100*b* and a self-locking wing 111*a*. In self-locking the hooked crimp 9 of this embodiment, the self-locking wings 111*a*, 111*b* are cross locked with the self-locking hooked pocket 100*a*, 100*b* during the crimping operation, which in turn gives more mechanical robustness and electrical robustness against mechanical and torsional stresses.

In order to contact an electrically conductive wire 30, the crimp 2, 5, 7, 9 is, for example, attached to a non-insulated wire 30, as shown for example in FIGS. 4B, 4C and 5B. The electrical insulation layer may be removed from at least a portion of ends of the electrical conductors 30 for exposing the conductor ends. In some alternative embodiments, the crimp 2, 5, 7, 9 is electrically connected to another crimp barrel 16 that is configured to be crimped around the end of another electrical wire, to mechanically and electrically connect the other electrical wire to the crimp 2, 5, 7, 9. In some alternative embodiments, the crimp 2, 5, 7, 9 is configured to electrically connect the electrical wire 30 to another electrical wire. In other words, the crimp 2, 5, 7, 9 may be used to splice the electrical wire 30 to another wire in some alternative embodiments.

Figure 7:
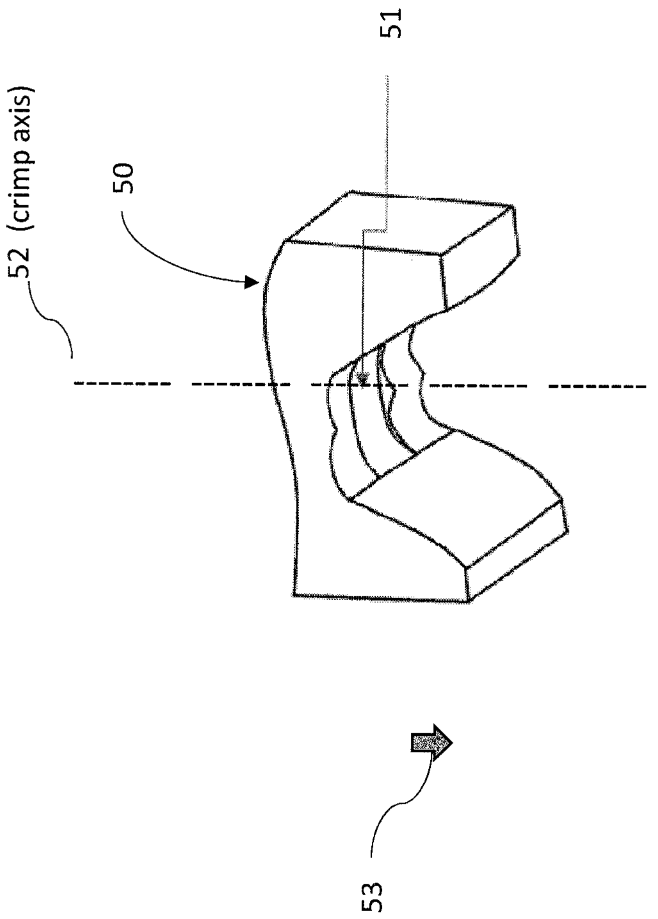
FIG. 7 is a perspective view of a crimper according to an embodiment.

The crimp 2, 5, 7, 9 of the above embodiments is used for realizing the electrical and mechanical connections using a crimping device 50 or crimper 50, shown in FIGS. 4D, 5C, and 7. The crimping device 50 crimps the crimp 2, 5, 7, 9 to a wire 30. In an embodiment, the electrical wire 30 has electrical conductors that are received in the crimp barrel 16. For example, an end segment of the wire 30 has exposed conductors that are loaded into the crimp barrel 16. During a crimping operation, the barrel 16 is crimped around the conductors 30 forming a mechanical and electrical connection between the crimp 2, 5, 7, 9 and the electrical wire 30.

FIG. 7 is a schematic view of a crimping device 50, also known as crimper, used in a crimping tool according a method of the present disclosure. When the crimping is started, the self-locking wing 11*a*, 11*b*, 111*a*, 111*b* enters the self-locking pocket 10*a*, 10*b*, 100*a*, 100*b* and get crimped with wires 30. The groove 51 in the crimper 50 allows an easy flow of the self-locking wing 11*a*, 11*b*, 111*a*, 111*b* for creating a seam self-locking.

The crimping operation entails forming the crimp connection 6, 8 to mechanically hold the conductors 30, and to provide an engagement between the conductors 30 and the crimp 2, 5, 7, 9. Forming of the terminal may include bending arms or tabs around the wire conductors 30 as in an open terminal (e.g., "F" type crimp), or compressing a closed barrel around the wire conductors 30 as in a closed terminal (e.g., "O" type crimp). As the terminal is formed around the wires 30 during the crimping action, the metal of the terminal and/or of the conductors 30 within the terminal may be extruded. It is desirable to provide a secure mechanical connection, and a good quality electrical connection between the terminal and the electrical wire 30. Using the embodiments of crimp tooling as disclosed herein creates a formed feature on the terminal that is formed during the crimping operation due to the extrusion of the metal(s). With this tooling, the formed feature can be formed on various types of terminals with varying terminal shapes and designs.

The crimping device 50 is provided with a crimping tooling member 51 with a profile for crimping the crimp 2, 5, 7, 9. During crimping, the profile aligns operationally with a front portion and a rear portion of the walls 4*a*, 4*b*, 104*a*, 104*b*, 124*a*, 124*b* of the crimp barrel 16 as shown in the embodiment of FIGS. 2 and 6. According to embodiments of this invention, the length of the side walls 4*a*, 4*b*, 104*a*, 104*b*, 124*a*, 124*b* is such that when the side walls 4*a*, 4*b*, 104*a*, 104*b*, 124*a*, 124*b* are engaged to form an interlocked seam, the ends of the side walls 4*a*, 4*b*, 104*a*, 104*b*, 124*a*, 124*b* do not hit the inner surface of the crimp 2, 5, 7, 9.

A crimping device 50 according to an embodiment may include an anvil and the crimp tooling member 51, as shown in FIG. 7. The anvil has a top surface that receives the crimp 2, 5, 7, 9 thereon. The electrical conductors 30 are received in the crimp barrel 16 on the anvil. The crimp tooling member 51 includes a forming profile that is selectively shaped to form or crimp the barrel 16 around the conductors 30 when the forming profile engages the crimp 2, 5, 7, 9. The forming profile defines part of a crimp zone in which the crimp 2, 5, 7, 9 and wire 30 are received during the crimping operation. The top surface of the anvil also defines a part of the crimp zone, as the terminal is crimped to the wire 30 between the crimp tooling member 51 and the anvil.

The crimp tooling member 51 is movable towards and away from the anvil along a crimp stroke in a direction 53 as shown in FIG. 7. The crimp stroke has an upward component away from the anvil, and a downward component towards the anvil. The crimp tooling member 51 moves bi-directionally towards and away from the anvil, along a crimp axis 52. The crimp tooling member 51 crimps the crimp 2, 5, 7, 9 around the electrical conductors 30 during the downward component of the crimp stroke as the crimp tooling member 51 moves towards the anvil. Although not shown, the crimp tooling member 51 may be coupled to a mechanical actuator that propels the movement of the crimp tooling member 51 along the crimp stroke. For example, the crimp tooling member 51 may be coupled to a movable ram of an applicator, or lead-maker machine. In addition, the applicator or the lead-maker machine may also include or be coupled to the anvil and the base support of the crimping device 50.

During a crimping operation, the crimp 2, 5, 7, 9 is loaded onto the top surface of the anvil. The wire 30 is moved in a loading direction towards the crimp zone such that the electrical conductors 30 are received in the crimp barrel 16 between the two side-walls 4*a*, 4*b*, 104*a*, 104*b*, 124*a*, 124*b* of the crimp barrel 16. As the crimp tooling member 51 moves toward the anvil, the forming profile descends over the crimp barrel 16 and engages the side walls 4*a*, 4*b*, 104*a*, 104*b*, 124*a*, 124*b* to bend or form the walls 4*a*, 4*b*, 104*a*, 104*b*, 124*a*, 124*b* around the electrical conductors 30. More specifically, side tabs and the top-forming surface of the forming profile gradually bend the side walls 4*a*, 4*b*, 104*a*, 104*b*, 124*a*, 124*b* over a top of the electrical conductors 30 as the crimp tooling member 51 moves downward.

The self-locking wing 11*a*, 11*b*, 111*a*, 111*b* is configured to engage with the self-locking hooked pocket 10*a*, 10*b*, 100*a*, 100*b* of the crimp 2, 5, 7, 9. At a bottom dead position of the crimp tooling member 50, which is the lowest position (or most proximate position to the base support) of the crimp tooling member 50 during the crimp stroke, part of the forming profile may extend beyond the top surface of the anvil. The crimp 2, 5, 7, 9 is compressed between the forming profile and the anvil, which causes the side walls 4*a*, 4*b*, 104*a*, 104*b*, 124*a*, 124*b* of the crimp barrel 16 to mechanically engage and electrically connect to the electrical conductors 30 of the wire. High compressive forces cause metal-to-metal bonds between the side walls 4*a*, 4*b*, 104*a*, 104*b*, 124*a*, 124*b* and the conductors 30. One or more embodiments described herein is directed to the forming profile such that the seam self-locking operation as described herein is formed when the side walls 4*a*, 4*b*, 104*a*, 104*b*, 124*a*, 124*b* of the crimp barrel 16 engage with each other.

The mechanics and the behavior of the crimp connection formed by the crimp 2, 5, 7, 9 under external forces will be described. There are two mechanisms for establishing and maintaining permanent contact in a crimp connection, namely cold welding and the generation of an appropriate residual force distribution. Both mechanisms contribute for creating a permanent connection and are independent of each other. During crimping, two metal surfaces are brought under an applied force to sliding or wiping actions, thus welding the metals in a cold version also known as cold welding. Under an appropriate residual force distribution, the contact interface will experience a positive force. During crimping, residual forces are developed between the conductor 30 and the crimp barrel 16 as the crimp tooling 50 is removed which is indicative of different elastic recovery.

When the electrical conductor 30 tends to the spring back more than the crimp barrel 16, the barrel 16 exerts a compressive force on the conductor 30 which maintains the integrity of the contact interface. The electrical and the mechanical performance of a crimped connection results from a controlled deformation of conductors 30 and crimp barrel 16 which produce micro cold welded junctions between the conductors 30 and between conductors 30 and the crimp barrel 16. These junctions are maintained by an appropriate residual stress distribution within the crimped connection which leads to residual forces which in turn maintain the stability of the junctions.

During the application of an external force (for example tensile force) on the crimp connection formed by crimps according to the prior art, the interlocking between the crimps flanks could be misaligned, thus resulting in a poor crimp connection. Crimps 2, 5, 7, 9 according to the embodiments described herein with the self-locking wing 11*a*, 11*b*, 111*a*, 111*b* and the self-locking pocket 10*a*, 10*b*, 100*a*, 100*b* are provided in embodiments of the seam self-locking crimp connection of the present disclosure. Such tapered embossed areas could be provided both inside or outside of the crimp flanks or side walls 4*a*, 4*b*, 104*a*, 104*b*, 124*a*, 124*b* thereby ensuring that interlocking is maintained even when the tensile force applied at an angle not equal to the normal vector in the lateral direction of the outer surface of the crimp flank 4*a*, 4*b*, 104*a*, 104*b*, 124*a*, 124*b*.

While the present disclosure has been particularly shown and described with reference to exemplary embodiments thereof, it will be understood by those skilled in the art that various changes in form and details may be made therein without departing from the disclosure and from the scope of the appended claims. The exemplary embodiments should be considered in a descriptive sense only and not for purposes of limitation.

What is claimed is:

1. A crimp, comprising:

a crimp barrel having a first side wall and a second side wall, the first side wall has a first end and a self-locking wing and the second side wall has a second end and a self-locking hooked pocket defining a pocket opening closed about its perimeter, the self-locking wing is adapted to extend through the pocket opening and further extend into a conductor material positioned within the crimp barrel and deform against and lock with the self-locking hooked pocket, wherein the first side wall and the second side wall are each of a length that the first end and the second end do not hit the inner surface of the crimp.

2. The crimp of claim 1, wherein the self-locking wing of the first side wall is a first self-locking wing and the self-locking hooked pocket of the second side wall is a first self-locking hooked pocket, the first side wall has a second self-locking hooked pocket and defines a first slot arranged between and separating the first self-locking wing and the second self-locking hooked pocket, and the second side wall has a second self-locking wing and defines a second slot arranged between and separating the second self-locking wing and the first self-locking hooked pocket, the second side wall is cross locked with the first side wall.

3. The crimp of claim 1, wherein the self-locking wing and the self-locking hooked pocket extend up to a base of the crimp from which the first side wall and the second side wall extend.

4. The crimp of claim 1, wherein the self-locking wing has an entry chamber.

5. The crimp of claim 1, wherein the self-locking hooked pocket has an entry guide in a front side and a rear side of the self-locking hooked pocket.

6. The crimp of claim 1, wherein the self-locking hooked pocket is bent at an angle of 180 degrees.

7. The crimp of claim 1, wherein the self-locking hooked pocket is bent at an angle of 120 degrees.

8. The crimp of claim 1, wherein the crimp barrel is a F-crimp wire barrel.

9. The crimp of claim 1, wherein at least one dimension of the pocket opening is greater adjacent a front side or a rear side of the second side wall than a corresponding dimension of a remaining portion of the pocket opening.

10. The crimp of claim 9, wherein the pocket opening comprises a generally rectangular opening.

11. The crimp of claim 1, wherein the pocket opening is defined through a curved portion of the second side wall.

12. The crimp of claim 11, wherein the curved portion of the second sidewall tapers in thickness approaching a free end thereof.

13. The crimp of claim 1, wherein a curved free end of the self-locking wing tapers in width and thickness.

14. A method for producing a crimp connection, comprising:

providing a crimp including a crimp barrel having a first side wall and a first end, and a second side wall and a second end, the first side wall has a self-locking wing and the second side wall has a self-locking hooked pocket defining a pocket opening closed about its perimeter;

bending the crimp barrel around a plurality of wires to insert the self-locking wing through the pocket opening and further extending into the plurality of wires, deforming a first edge of the self-locking wing and a second edge of the self-locking hooked pocket against each other to create an interlock seam, and thereby lock the self-locking wing with the self-locking hooked pocket wherein the first side wall and the second side wall are each of a length that the first end and the second end do not hit the inner surface of the crimp.

15. The method of claim 14, wherein the self-locking wing of the first side wall is a first self-locking wing and the self-locking hooked pocket of the second side wall is a first self-locking hooked pocket, the first side wall has a second self-locking hooked pocket and the second side wall has a second self-locking wing, the second side wall is cross locked with the first side wall in the bending step.

16. The method of claim 14, wherein the self-locking wing has an entry chamber.

17. The method of claim 14, wherein the self-locking hooked pocket has an entry guide in a front side and a rear side of the self-locking hooked pocket.

18. The method of claim 14, wherein the self-locking hooked pocket is bent at an angle of 180 degrees or 120 degrees.

19. The method of claim 14, wherein the crimp barrel is a F-crimp wire barrel.

20. A crimping device, comprising:

a crimp tooling member having a profile for crimping a crimp including a crimp barrel having a first side wall and a second side wall, the first side wall has a first end and a self-locking wing and the second side wall has a second end and a self-locking hooked pocket defining a pocket opening closed about its perimeter, the profile aligns operationally during crimping with a front portion and a rear portion of the first side wall and the second side wall and is adapted to bend the crimp barrel to insert the self-locking wing through the pocket opening and further extend into a conductor material positioned within the crimp barrel wherein the first side wall and the second side wall are each of a length that the first end and the second end do not hit the inner surface of the crimp, deform a first edge of the self-locking wing and a second edge of the self-locking hooked pocket against each other to create an interlock seam, and lock the self-locking wing with the self-locking hooked pocket.

* * * * *